United States Patent [19]

Bechara et al.

[11] 3,853,818

[45] Dec. 10, 1974

[54] AMINOBORATE ESTERS AS POLYURETHANE CATALYSTS

[75] Inventors: Ibrahim S. Bechara, Boothwyn; Dewey G. Holland, Chadds Ford, both of Pa.

[73] Assignee: Air Products and Chemicals, Inc., Wayne, Pa.

[22] Filed: Jan. 22, 1973

[21] Appl. No.: 325,912

[52] U.S.Cl............... 260/75 NC, 260/2.5 AC, 260/77.5 AC, 260/462 R
[51] Int. Cl...................... C08g 22/38, C08g 22/46
[58] Field of Search.. 260/75 NC, 2.5 AC, 77.5 AC, 260/462 R

[56] References Cited
UNITED STATES PATENTS

| | | | |
|---|---|---|---|
| 3,127,404 | 3/1964 | Mascioli | 260/268 |
| 3,185,644 | 5/1965 | Knowles et al. | 260/462 R X |
| 3,380,963 | 4/1968 | Thomas | 260/462 R X |
| 3,428,469 | 2/1969 | Cyba | 260/462 R X |
| 3,786,029 | 1/1974 | Bechara et al. | 260/2.5 AC |

*Primary Examiner*—H. S. Cockeram
*Attorney, Agent, or Firm*—Bernard M. Weiss; Barry Moyerman

[57] ABSTRACT

This invention relates to the utility of nitrogen containing borate esters. In particular, it relates to a process for preparing polyurethanes employing nitrogen coordinated borate esters as the activators. These borate esters are found to be superior polyurethane catalysts when compared with the tertiary aminoalkanols from which they are derived.

8 Claims, No Drawings

AMINOBORATE ESTERS AS POLYURETHANE CATALYSTS

BACKGROUND OF THE INVENTION

1. Field of the Invention

This invention is concerned with the uses of the dialkylaminoorthoborates as activators for polyurethane formation. In particular, the invention concerns the use of nitrogen coordinated borate esters as activators in the preparation of polyurethane foams.

2. Description of the Prior Art

It is well known that certain tertiary alkanolamines, i.e., dimethylethanolamine, are desirable catalysts for polyurethanes due to their extremely low cost in comparison to the cost of other popular catalysts such as N-ethylmorpholine. Unfortunately, and to the disappointment of urethane technologists, these compounds suffer from relatively high toxicity, volatility, and odor. Also, the foams prepared with these catalysts suffer from undesired long gel and long tackfree times.

In an effort to improve the deficiencies of these alkanolamines, it has been found that their borate esters are of much superior activity, lower toxicity, lower odor, and lower volatility. Yet, they have cost-performance advantages desirable to the urethane technologist.

The existence of aminoborate ester compounds has been known in the art for some time. A publication authored by D. S. Matteson, entitled "Synthesis of 4-butoxy-1-thia-4-boracyclohexane via Dimethylaminoethyl — and Butyldivinylborinates" in the *Journal of Organic Chemistry*, Vol. 27: 275–278, 1962, discloses a method for producing these compounds. It also provides their infrared spectrum and boiling point data.

Studies pertaining to the structural form in which certain aminoborate esters exist as well as their method of preparation are disclosed in an article by D. W. Meek and C. S. Springer entitled "A Nuclear Magnetic Resonance Study of Hydrogen Bonding in Tris(2-N-methylaminoethyl) Borate and Similar Compounds" published in *Inorganic Chemistry*, Vol. 5 (Issue No. 3): 445–450, 1966.

U.S. Pat. No. 2,990,423 is concerned with the preparation of hydrocarbylaminohydrocarbyl borate-diborane adducts in which an aminoborate ester is a reactant.

The preparation of polyglycidyl ether compositions used in electrical insulators, is discussed in U.S. Pat. No. 3,072,737. N-coordinated B compounds such as tris(2-aminoethyl) borate are used as curing catalysts for this epoxy resin formulation. Not disclosed here is the tertiary amine structure of the aminoborate esters which impart good urethane catalyst properties.

SUMMARY OF THE INVENTION

In accordance with this invention it has been discovered that certain aminoborate esters are effective activators in the catalysis of polyurethane precursor systems. The aminoborate esters have the general formula:

$B(L)_y(OR)_{3-y}$ where

L is $(OCHR'CH_2)_nN(R'')_2$
y is an integer from 1 to 3,
n is an integer from 1 to 2,
R is an independently selected alkyl radical of 1 to 4 carbon atoms,
R' is a radical independently selected from the group consisting of hydrogen, $CH_3$ and $CH_2N(CH_3)_2$, and
R'' is a radical independently selected from the group consisting of an alkyl group of 1 to 2 carbon atoms and an aryl radical.

These compounds can be prepared from the desired alkanolamine and any alkyl borates of the general formula $B(OR)_3$, where R is as defined above, by transesterification of the alkoxy groups, wholly or partially, by an alkanolamine of the structure

where R', and R'' and n are as previously defined. The claimed compounds can also be made from boric acid by treatment with the dialkylaminoalkanols and subsequent removal of water formed.

The orthoborates needed as reactants are those having the general formula $B-(OR)_3$ where R is as defined above. These compounds can generally be prepared from boric acid and alkanols by simply heating a mixture of these reactants and removing the water that is formed. Examples of orthoborates that can be prepared in this manner are trimethylorthoborate, triethylorthoborate, tribenzylorthoborate, and the like.

The aminoalkanols that are suitable starting material are those having the general formula

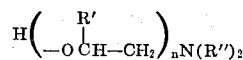

where R', R'' and n are as defined above. Several examples of aminoalkanols that can be used according to this invention are as follows:

N,N dimethylethanolamine
N,N diethylethanolamine
N,N dimethyldiglycolamine
N,N dimethylisopropanolamine
N, methyl N phenylethanolamine.

Among the compounds prepared and evaluated are:

$B-[OCH_2CH_2-N(CH_3)_2]_3$

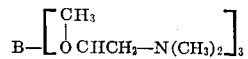

$B-[O-CH_2CH_2-OCH_2CH_2-N(CH_3)_2]_3$

Other appropriate aminoborates that can be synthesized and are within the scope of this invention are:

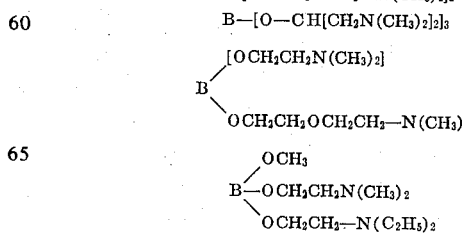

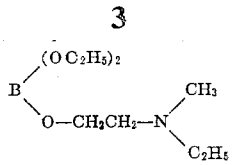

The aminoborate orthoesters, as activators, can be used in the concentration range of 0.05 to 1.5 PHP (parts by weight per hundred parts by weight of polyol) and preferably in the range of 0.2 to 1.0 PHP.

They can be employed by themselves or in combination with previously known activators, particularly organometallic activators such as organometallic tin and organometallic lead. Also the aminoborate orthoesters may be used to an advantage in combination with other amine activators such as triethylenediamine, oxy bis(-dimethylethylamine), and 4(2-dimethylaminoethyl)-morpholine, particularly in the production of highly resilient polyurethane foams.

Typical formulations in which the above claimed compounds can be used as activators comprise:

1. Compounds which contain active hydrogen atoms and

2. Multifunctional isocyanates

Such formulations may also include additives such as blowing agents, emulsifiers, surfactants, fire retardants, fillers, pigments, and others.

Compounds which contain active hydrogen atoms are those polyols having at least two active hydrogens. The term active hydrogen atoms refers to hydrogen atoms which because of their position in the molecules, display activity according to the Zerewitinoff test as described by Kohler in J. of Am. Chem. Soc. 49, 3181, (1927).

Multifunctional isocyanates which may be used as precursors material according to the invention are those known aliphatic araliphatic and aromatic polyisocyanates. Examples of these are the 2,4- and 2,6-tolyleneiisocyanates and mixtures thereof, bis(4-isocyanatophenyl)urethane and higher molecular weight products produced by the phosgenation of aniline/formaldehyde condensation products, dimers, and trimers of diisocyanates, polyisocyanates, and the like.

A suitable starting material for the production of polyurethanes in the process according to the invention is the so-called prepolymer. This is the reaction product of polyol with excess polyisocyanate. Also to be included are the polymerized isocyanates containing isocyanurate rings.

DESCRIPTION OF THE PREFERRED EMBODIMENTS

This invention is further clarified by reference to a plurality of examples.

EXAMPLE I

In a 250 cc three neck flask equipped with a reflux condenser, a gas inlet and a thermometer was placed 89 g of N,N-dimethylethanolamine and 5 cc of water and a small amount of sodium hydroxide. The mixture was warmed to about 80°–90°C and ethylene oxide was bubbled in slowly while stirring the solution by means of a magnetic stirrer. After the reaction flask gained approximately 44 g weight the addition of ethylene oxide was stopped and the reaction mixture distilled.

A product distilled at 195°C and 760 mm Hg. This product weighed 25 g and was identified by NMR (Nuclear Magnetic Resonance) spectroscopy to be N,N-dimethyldiglycolamine. Its R.I. (Refractive Index) at 27°C was 1.4397.

EXAMPLE II

A mixture of 20 g (0.15 mole) of N,N-dimethyldiglycolamine and 3.1 g (0.05 mole) of boric acid was heated in an oil bath under reduced pressure and a temperature not exceeding 220°C. The water formed was continuously removed. When the water ceased to distill, the pressure was gradually reduced to 1 mm of Hg and the product distilled at 175°–177°C as colorless liquid. The weight of this product was 15 g and its refractive index at 28°C was measured as 1.4455. The IR (infrared) and NMR spectral analysis both support the structure of tris(N,N-dimethyldiglycolamine)borate.

| The analysis based on | $C_{18}H_{42}BN_3O_6$ is |
|---|---|
| Calculated : | C, 53.07; H, 10.32; N, 10.32 |
| Found : | C, 52.81; H, 10.56; N, 10.40 |

EXAMPLE III 109 g of Selectrofoam 6406 (PPG Industries, Inc.) polyol, 47 g of Freon 11-B (Du Pont, E. I. de Nemours & Co.), 1.5 g of DC-193 (Dow Corning Corp.) surfactant, and 0.1 g of T-12 (M & T Chemicals Inc.) dibutyltindilaurate were mixed in a 5 quart paper tub. To this mixture was added 1.0 part of the amine catalyst being evaluated and the mixture stirred with a high speed mechanical stirrer for 15 seconds. Then 105 g of Hylene TIC (Du Pont, E. I. de Nemours & Co.) diisocyanate was added and the mixture blended again with the high speed stirrer for 10–15 seconds. The cream, gel, rise and tack times were recorded on each formulation. Table 1 shows comparative testing data for DMEA and DMEA borate ester.

TABLE 1

| Catalyst | Concentration of Catalyst in grams | |
|---|---|---|
| N,N-dimethylethanol-amine (DMEA) | 1.0 | |
| Tris(N,N-dimethyl-ethanolamine)(DMEA borate) | | 1.0 |
| Cream Time, sec. | 12 | 10 |
| Gel Time, sec. | 51 | 35 |
| Rise Time, sec. | 165 | 60 |
| Tack time, sec. | 165 | 56 |
| Tub Density, pcf | 1.65 | 1.57 |

It can be concluded that the tests performed for this example clearly demonstrate the superiority of DMEA borate over that of DMEA as activator for rigid polyurethane foams.

EXAMPLE IV

The same procedure as in Example III was followed except that the formulations were changed to those of flexible foams. They were 100 g of Voranol CP-3000 (Dow Chemical Co.), 1.0 g of DC-190 (Dow Corning Corp.) surfactant, 3.5 g of water, 0.25 g of 50 percent T-9 (M & T Chemicals Inc.) catalyst in CP-3000 and 0.15 and 0.6 g of the amine being evaluated. The mixture was stirred for 10 seconds with the high speed mechanical stirrer. Then 43.5 g of tolylene diisocyanate (80 parts by wt./20 parts by wt. mixture) were added and again the mixture was stirred for 10 seconds. The cream, hard gel, and rise time were recorded using various catalysts.

Table 2 summarizes the data obtained.

TABLE 2

| Catalysts | Concentration of Catalysts in grams | | | |
|---|---|---|---|---|
| DMEA | 0.15 | 0.6 | | |
| DMEA borate | | | 0.15 | 0.15 |
| *DABCO | | | | | 0.15 |
| Cream Time, sec. | — | 14 | 13 | 12 | 12 |
| Hard Gel, sec. | — | 135 | 163 | 151 | 98 |
| Rise Time, sec. | Collapsed | 122 | 123 | 118 | 87 |

* 1,4-diazabicyclo [2.2.2]octane, a standard amine catalyst in the urethane industry, commerically available from Houdry Process and Chemical Co. Division of Air Products and Chemicals, Inc.

These tests clearly demonstrate the four fold concentration advantage enjoyed by the borate, compared with the alkanolamine from which it was derived.

EXAMPLE V

A premix of polyether flexible foam formulation consisting of 200 g Voranol CP-3000 polyol, 2 g L-548 (Union Carbide Corp.), 7.2 g of water, 1.0 g of T-10 (M & T Chemicals Inc.) tin catalyst, and 0.16 and 0.2 g of amine catalyst was blended with a high speed mechanical stirrer for about 10-15 seconds. To this blend was added 91 g of tolylene diisocyanate (80 parts by wt./20 parts by wt. mixture) and the new mixture was stirred again with the high speed mechanical stirrer for 10 seconds. Then it was poured into a five quart tub. The times for the cream, rise and hard gel were recorded for several catalysts. Table 3 summarizes the activity of the various catalysts tried.

TABLE 3

| Catalyst | Concentrations of Catalysts in grams | | | |
|---|---|---|---|---|
| N,N dimethyldiglycolamine | 0.16 | 0.2 | | |
| N,N dimethyldiglycolamine borate | | | 0.16 | 0.2 |
| Cream Time, seconds | 23 | 21 | 23 | 20 |
| Rise Time, seconds | 160 | 150 | 134 | 134 |
| Hard gel time, seconds | 165 | 158 | 152 | 144 |

The test results of this example demonstrate the superiority of dimethyldiglycolamine borate in a flexible urethane formulation over the dimethyldiglycolamine from which it is derived.

EXAMPLE VI

A premix of the rigid urethane type consisting of 109 g of Selectrofoam 6406 polyol, 47 g of Genetron R-11 SBA (Allied Chemical Corp.) blowing agent, 1.5 g of DC-193 silicone surfactant, 0.1 g of T-12 tin catalyst and 0.8 g - 1.0 g of tertiary amine catalyst was blended with a high speed mechanical stirrer for about 10-15 seconds. To this premix was added 105 g of Hylene TIC diisocyanate and the new mixture was blended again with the high speed mechanical stirrer for 10 seconds. It then was poured into a 5 quart tub. The times for the cream, gel, rise and tack free were recorded.

Table 4 summarizes the data obtained using different amine catalysts.

TABLE 4

| Catalyst | Concentrations of Catalysts in grams | |
|---|---|---|
| N,N dimethyldiglycolamine | 0.8 | |
| N,N dimethyldiglycolamine borate | | 0.8 |
| Cream Time, sec. | 26 | 24 |
| Gel Time, sec. | 50 | 45 |
| Rise Time, sec. | 112 | 98 |
| Tack Free Time, sec. | 108 | 85 |
| Tub Density, pcf | 1.54 | 1.58 |

The above test results again clearly demonstrate the superiority of the N,N dimethyldiglycolamine borate, in a rigid foam formulation, to the N,N dimethyldiglycolamine from which it is derived.

EXAMPLE VII

In a distillation apparatus connected to a vacuum line the DMEA borate and DMEA were distilled at various pressures. Table 5 gives comparative boiling point data for these compounds.

TABLE 5

| DMEA | | DMEA Borate | |
|---|---|---|---|
| b.p./°C. | Pressure/ mm Hg | b.p./°C | Pressure/ mm Hg |
| 76 | 98 | 110 | 1 |
| 105 | 290 | 134 | 4 |
| 120 | 503 | 300 | 765 |
| 134 | 763 | | |

This example illustrates the much lower vapor pressure of DMEA borate to that of DMEA. Thus, the DMEA borate exhibits less odor at a given set of conditions. Therefore, less exposure to operating personnel results from utilization of the orthoborates as opposed to the alkanolamines from which they are derived.

We claim:

1. In the method of preparing polyurethane compositions from formulations comprising a precursor of at least one polyol having a minimum of two active hydrogen atoms per molecule, a reactive isocyanate, and a catalyst, the improvement in which the catalyst comprises an effective activating amount of an aminoborate orthoester of the formula:

$B(L)_y(OR)_{3-y}$ where

L is $(OCHR'CH_2)_nN(R'')_2$ y is an integer from 1 to 3, n is an integer from 1 to 2, R is an independently selected alkyl radical of 1 to 4 carbon atoms, R' is a radical independently selected from the group consisting of hydrogen, $CH_3$ and $CH_2N(CH_3)_2$, and R'' is a radical independently selected from the group consisting of an alkyl group of 1 to 2 carbon atoms and an aryl radical.

2. The method in accordance with claim 1 wherein said polyol is polyether polyol.

3. The method in accordance with claim 1 wherein said polyol is polyester polyol.

4. The method in accordance with claim 1 wherein said aminoborate orthoester is employed in an amount of from 0.05 to 1.5 parts by weight per hundred parts by weight of polyol.

5. The method in accordance with claim 2 wherein said aminoborate orthoester is employed in an amount of from 0.2 to 1.0 parts by weight per hundred parts by weight of polyol.

6. The method in accordance with claim 3 wherein said aminoborate orthoester is employed in an amount of from 0.2 to 1.0 parts by weight per hundred parts by weight of polyol.

7. The method in accordance with claim 1 wherein the catalyst is comprised of aminoborate ester and at least one organometallic compound selected from the group consisting of organometallic tin and organometallic lead.

8. The method in accordance with claim 7 wherein said aminoborate orthoester is employed in an amount of from 0.05 to 1.5 parts by weight per hundred parts by weight of polyol.

* * * * *